Figure 1:
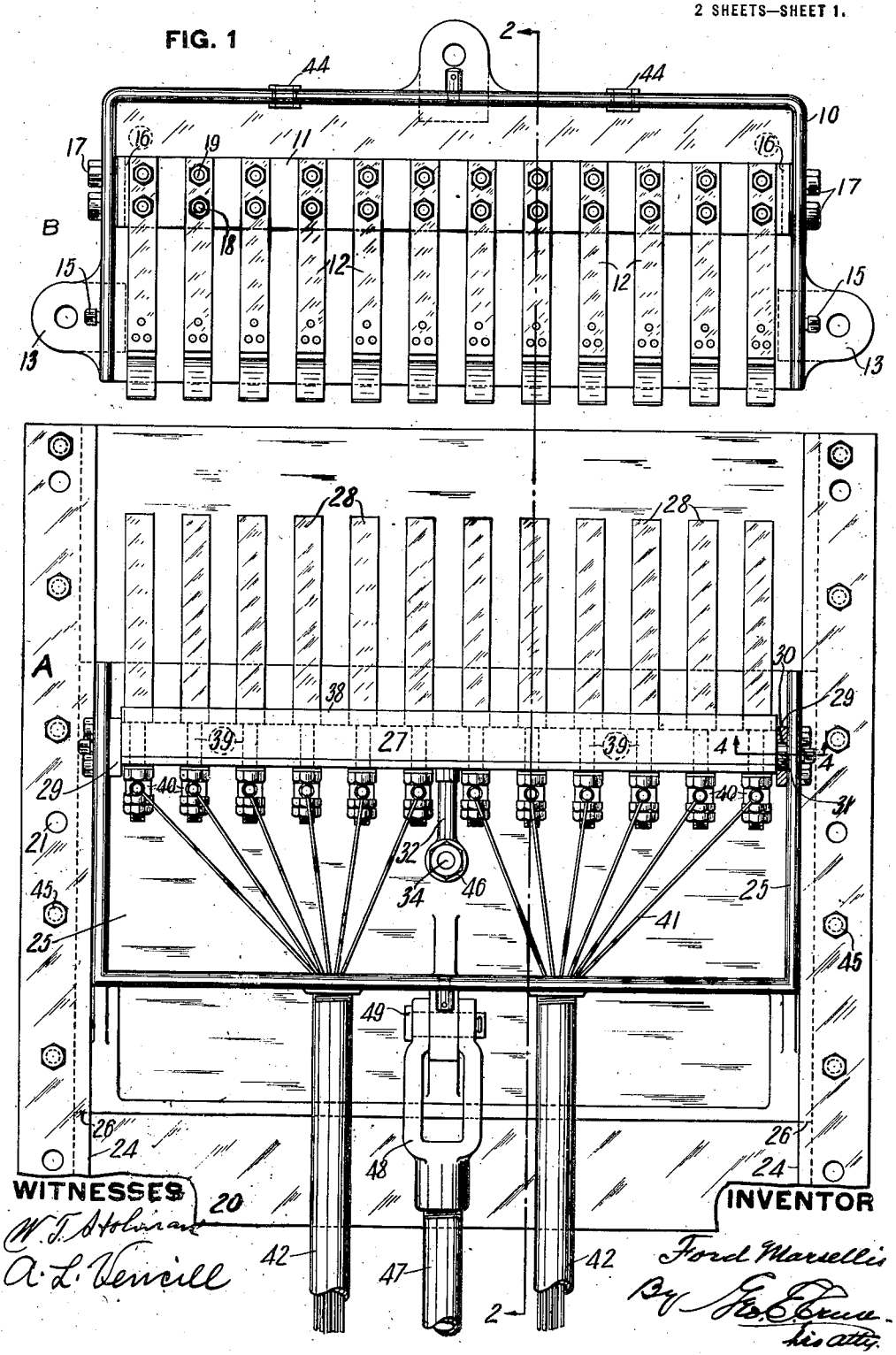

F. MARSELLIS.
DRAWBRIDGE CIRCUIT CONTROLLER.
APPLICATION FILED NOV. 12, 1912.

1,139,047.

Patented May 11, 1915.
2 SHEETS—SHEET 1.

F. MARSELLIS.
DRAWBRIDGE CIRCUIT CONTROLLER.
APPLICATION FILED NOV. 12, 1912.
1,139,047.
Patented May 11, 1915.
2 SHEETS—SHEET 2.
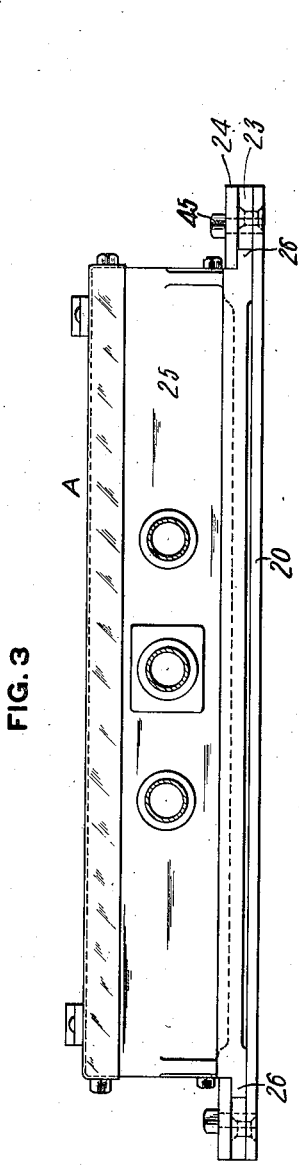
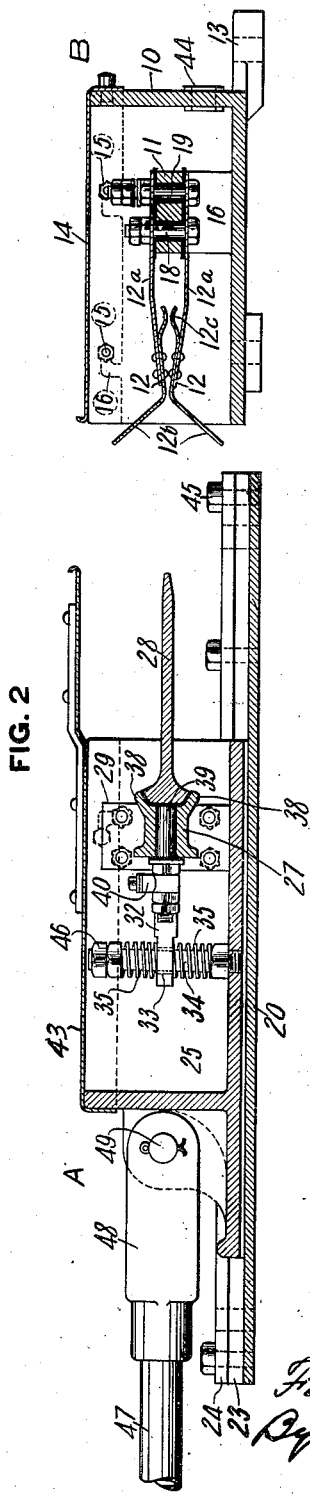
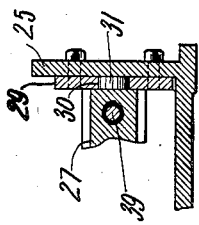
WITNESSES
INVENTOR
Ford Marsellis

UNITED STATES PATENT OFFICE.

FORD MARSELLIS, OF BERKELEY, CALIFORNIA.

DRAWBRIDGE CIRCUIT-CONTROLLER.

1,139,047.    Specification of Letters Patent.    Patented May 11, 1915.

Application filed November 12, 1912. Serial No. 730,874.

*To all whom it may concern:*

Be it known that I, FORD MARSELLIS, a citizen of the United States, residing at Berkeley, in the county of Alameda and State of California, have invented certain new and useful Improvements in Drawbridge Circuit-Controllers, of which the following is a specification.

My invention relates to circuit controllers for drawbridges.

I will describe one form of circuit controller embodying my invention, and then point out the novel features thereof in claims.

In the accompanying drawings, Figure 1 is a top plan view showing one form of circuit controller embodying my invention, the covers being removed. Fig. 2 is a sectional view on the line 2—2 of Fig. 1 looking in the direction of the arrows. Fig. 3 is an end view of the portion A of the circuit controller shown in Figs. 1 and 2. Fig. 4 is a fragmental view showing in detail part of the circuit controller shown in the preceding views.

Similar reference characters refer to similar parts in each of the several views.

Referring now to the drawings, A and B designate two parts of the circuit controller, one of which parts may be located on the drawbridge proper and the other on the abutment. For purposes of the present specification it will be assumed that the part A is located on the bridge proper and that the part B is located on the abutment.

Mounted in the part B is a set of contact fingers 12 which fingers are, here shown as stationary. Mounted in the part A is a set of contact fingers 28 which slide longitudinally into and out of engagement with fingers 12 in a manner hereinafter explained.

The part B comprises a case 10 which may be secured to the abutment by means of bolts or lag screws passing through holes in lips 13. This case is provided with a cover 14 (see Fig. 2) which is held in place by screws 15 in the case which fit into suitable elongated slots 16 in the cover.

Mounted within the case 10 is a block 11 which carries the contact fingers 12. As here shown this block is of metal; it rests upon projecting shoulders 16 formed in the case 10 and is held in place by screws 17 passing through the walls of the case. The block 11 is provided with pairs of holes through which pass bolts 18 and 19 which hold the contact fingers 12 in place. These bolts and fingers are insulated from the block 11 by insulating washers and strips as clearly shown in Fig. 2. Each of the bolts 19 is provided with washers and an additional nut so that by means of these bolts electric wires may be connected with the contact fingers 12. These wires pass out through suitable holes 44 in the back of the case.

As here shown, the fingers 12 are in pairs, the fingers of each pair being mounted respectively on the top and bottom of the block 11. The two fingers of each pair are bent toward each other so that they normally touch or almost touch, and the ends of the fingers beyond the touching point are flared outwardly in opposite direction to serve as guides to assist contact fingers 28 to enter between them. In the particular construction here shown, each finger 12 is formed of two portions, a main portion 12ª which is secured to the block 11, and an end portion 12ᵇ which is secured to the main portion 12ª by means of rivets. The inner ends of the end portions 12ᵇ are bent toward each other as shown to make contact at additional points 12ᶜ with fingers 28.

The part A of the circuit controller comprises a guide plate 20 which rests upon the drawbridge and which may be secured thereto by means of bolts or lag screws passing through holes 21. The guide plate 20 is provided with guiding grooves in the following manner. Along two sides of the plate 20 are riveted strips 23, and upon each of these strips a second strip is placed and secured to the plate by screws 45. The strips 24 overhang the inside edges of the strips 23 and thereby form grooves for a purpose which I will now explain.

Mounted on the guide plate 20 is a case 25 which fits between the strips 24 and whose sides near the bottom are provided with lips 26 which fit into the grooves in the guide plate. It will be seen therefore that the case may slide back and forth in the guide plate but cannot be raised therefrom except by removing the plates 24. The case 25 is provided with a cover 43 which is secured thereto in a manner similar to that hereinbefore explained for the cover of case 10.

Mounted within the case 25 is a block 27 which carries the contact fingers 28. This block is not rigidly fixed to the case 25, but is pivotally mounted therein in the following manner. Fastened to the interior walls of the case 25 on opposite sides thereof are two bearing plates 29 each of which is provided with a hole 30. (See Figs. 1 and 4). The ends of block 27 are provided with trunnions 31 which fit freely in the holes 30 so that the block 27 is free to oscillate on a horizontal axis. The block 27 is held normally in such position that the fingers are horizontal, by means which I will now explain.

Screwed into the block 27 is a leveling arm 32 the outer end of which is provided with a hole 33.

Mounted in the bottom of the case 25 is a stud 34 which passes vertically upward through the hole 33 in the leveling arm and is threaded at the top to receive one or more nuts 46.

Surrounding the stud 34 are two spiral springs 35, one above and one below the leveling arm 32. These springs are compressed by the nuts 46 and bear upon the upper and lower faces of the leveling arm thereby holding the arm and the block 27 normally in such position that the contact fingers 28 are horizontal. By varying the position of the nuts 46 the compression of the springs can be varied, and the normal position of the fingers 28 can thereby be varied through a small angle above and below the horizontal to compensate for variations in the normal vertical alinement of the two sets of fingers 28 and 12.

It will be seen that by means of the pivotal mounting of the block 27 and fingers 28, these fingers may oscillate and thereby avoid strain on the contact fingers during vertical movements of the drawbridge relative to the abutment.

I will now explain the manner in which, as here shown, the contact fingers 28 are mounted in block 27. The front face of block 27 is provided with flaring lips 38 which form a groove in which rest the butts of the fingers 28. Each finger is provided with a stud 39 which passes through a suitable hole in the block 27. The studs and other parts of the fingers are insulated from the block 27 (which as here shown is of metal) by suitable bushings and strips of insulating material as shown. The outer end of each stud 39 is threaded, the threaded portion being provided with a nut and washer by means of which the contact finger is held in place in the block 27. Also screwed onto the threaded portion of each stud 39 is a terminal post 40 to which a wire 41 may be secured for electrical connection with the contact finger. This terminal post is held in place by one or more other nuts.

The wires 41 leading to the several contact fingers are carried into the case 25 through pipes 42 screwed into suitable holes in the end of the case, the wires being secured to the pipes so that they are prevented from sliding therein. By means of this construction, all flexure of the wires occurs outside of the case 25 where there is plenty of space, hence the liability of breakage of the wires due to flexure is much less than if the flexure occurred within the case.

The case 25 is reciprocated on the base plate by means of a pipe or rod 47 which is connected with the case by a connecting jaw 48 and pin 49. These reciprocating movements of course move the contact fingers 28 into and out of engagement with fingers 12, thereby closing and opening the circuits controlled by the circuit controller.

Although I have herein shown and described only one form of circuit controller embodying my invention, it is understood that various changes and modifications may be made therein without departing from the spirit and scope of my invention.

Having thus described my invention, what I claim is:—

1. A drawbridge circuit controller comprising two coöperating sets of contact fingers one of which sets is mounted on the drawbridge and the other on the abutment, a block carrying one of said sets said block being pivotally mounted to prevent straining the fingers during vertical movements of the bridge relative to the abutment, a leveling arm secured to the said block, and springs acting upon said leveling arm for biasing said block to normal position.

2. A drawbridge circuit controller comprising two coöperating sets of contact fingers one of which sets is mounted on the bridge and the other on the abutment, and one of which sets is movable longitudinally into and out of engagement with the other, a block carrying one of said sets said block being pivotally mounted to permit vertical oscillation of the fingers carried thereby, a leveling arm secured to the said block, springs acting upon said leveling arm for biasing the block to normal position, and means for varying the compression of said springs to vary the normal position of the said block.

3. A drawbridge circuit controller comprising two coöperating sets of contact fingers one of which sets is movable longitudinally into and out of engagement with the other, a block carrying one of said sets said block being pivotally mounted to permit oscillations of the fingers carried thereby, a leveling arm secured to said block, a hole in the arm, a stud fixed with respect to the arm and passing through the hole and two coiled springs on the stud one on each side of the arm.

4. A drawbridge circuit controller comprising two coöperating sets of contact fingers one of which sets is movable longitudinally into and out of engagement with the other, a block carrying one of said sets said block being pivotally mounted to permit oscillations of the fingers carried thereby, a leveling arm secured to said block, a hole in the arm, a stud fixed with respect to the arm and passing through the hole, and two coiled springs on the stud one on each side of the arm, and a nut on the stud for varying the compression of the springs.

5. A drawbridge circuit controller comprising a set of horizontally spaced contact fingers, a second set of contact fingers arranged in pairs, the pairs being horizontally spaced to register with the fingers of the first set and the fingers of each pair being mounted one above the other to receive between them the registering finger of the first set, one of said sets being pivotally mounted to permit of oscillation in a vertical plane to compensate for vertical relative movement of the two sets, and means for moving one of said sets of fingers longitudinally into and out of engagement with the other set.

6. A circuit controller comprising two separable parts one adapted to be mounted on one of two separable members adapted to be brought together and the other adapted to be mounted on the other of said members, one of said parts comprising a set of contact fingers and the other of said parts comprising a guide plate, a case adapted to slide in the guide plate, a block horizontally mounted on trunnions in said case, a second set of contact fingers carried by said block and adapted to make contact with the fingers of the first-mentioned set, and means for biasing said block to an intermediate position.

7. A circuit controller comprising two separable parts one adapted to be mounted on one of two separable members adapted to be brought together and the other part adapted to be mounted on the other member, one of said parts comprising a set of contact fingers, and the other of said parts comprising a guide plate, a case adapted to slide in the guide plate, a block horizontally mounted on trunnions in the case, and a second set of contact fingers carried by said block and adapted to engage with the first named set of contacts.

8. A circuit controller comprising two separable parts one adapted to be mounted on one of two separable members adapted to be brought together, and the other part adapted to be mounted on the other member; one of said members being capable of vertical movement with relation to the other after engagement of said parts, one of said parts comprising a set of contact fingers; and the other of said parts comprising a block pivotally mounted for oscillation in a vertical plane, a second set of contact fingers mounted on said block and adapted to engage with the first-mentioned contacts, and means for biasing said block to the normal position.

9. A circuit controller comprising two separable parts one adapted to be mounted on one of two separable members adapted to be brought together, and the other part adapted to be mounted on the other member, one of said members being capable of movement in one direction with relation to the other after the engagement of said parts; one of said parts comprising a set of contact fingers; and the other of said parts comprising a block pivotally mounted for oscillation in the same direction as the said relative movement of the one member, a second set of contact fingers mounted on said block and adapted to engage with the first-mentioned contact fingers when the said parts are brought together, and means for biasing said block to a normal position.

In testimony whereof I affix my signature in presence of two witnesses.

FORD MARSELLIS.

Witnesses:
ARTHUR V. ASTLEY,
JOHN L. FREEMANN.